Jan. 9, 1962   R. H. ENSIGN ET AL   3,015,899
THREE DIMENSIONAL DISPLAY DEVICE
Filed Jan. 29, 1960   9 Sheets-Sheet 1

INVENTORS.
MILTON IMMERMANN
DANFORTH CARDOZO, JR.
GEORGE WOODS
ROBERT H. ENSIGN

BY Kane, Dalsimer and Kane
ATTORNEYS

Jan. 9, 1962  R. H. ENSIGN ET AL  3,015,899
THREE DIMENSIONAL DISPLAY DEVICE
Filed Jan. 29, 1960  9 Sheets-Sheet 2

INVENTORS.
MILTON INNERMANN
DANFORTH CARDOZO, JR.
GEORGE WOODS
ROBERT H. ENSIGN
BY Kane, Dalsimer and Kane
ATTORNEYS

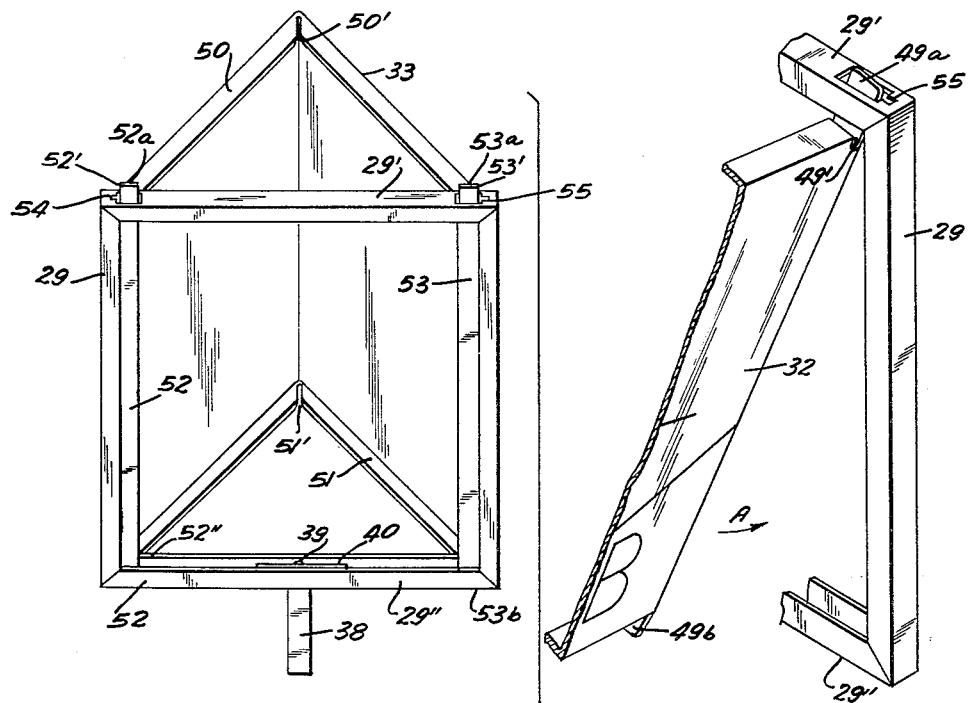
FIG. 6
FIG. 5
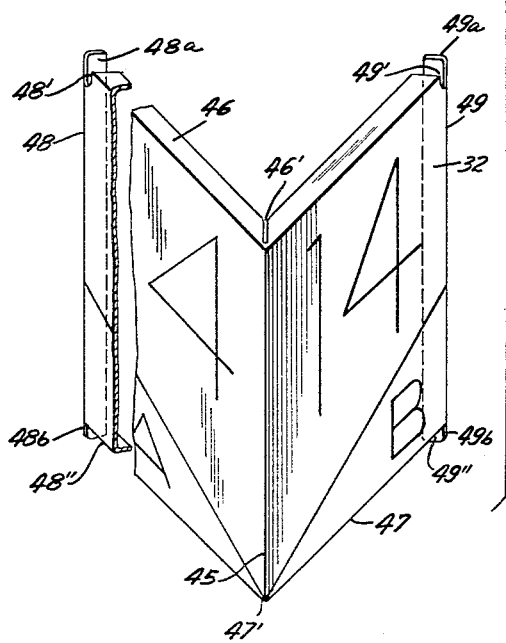
INVENTORS.
MILTON IMMERMANN
DANFORTH CARDOZO, JR.
GEORGE WOODS
ROBERT H. ENSIGN
BY Kane, Dalsimer and Kane
ATTORNEYS

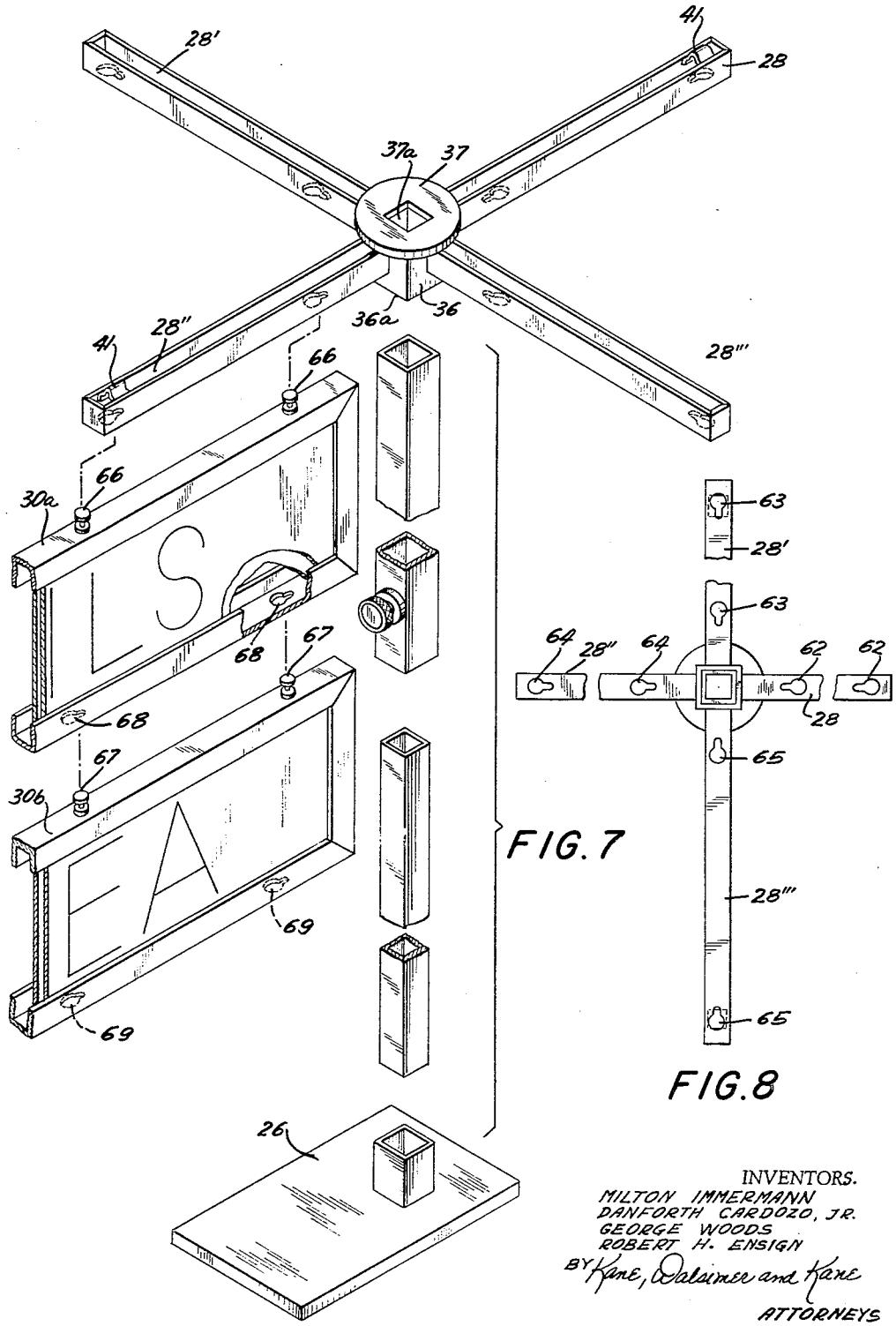

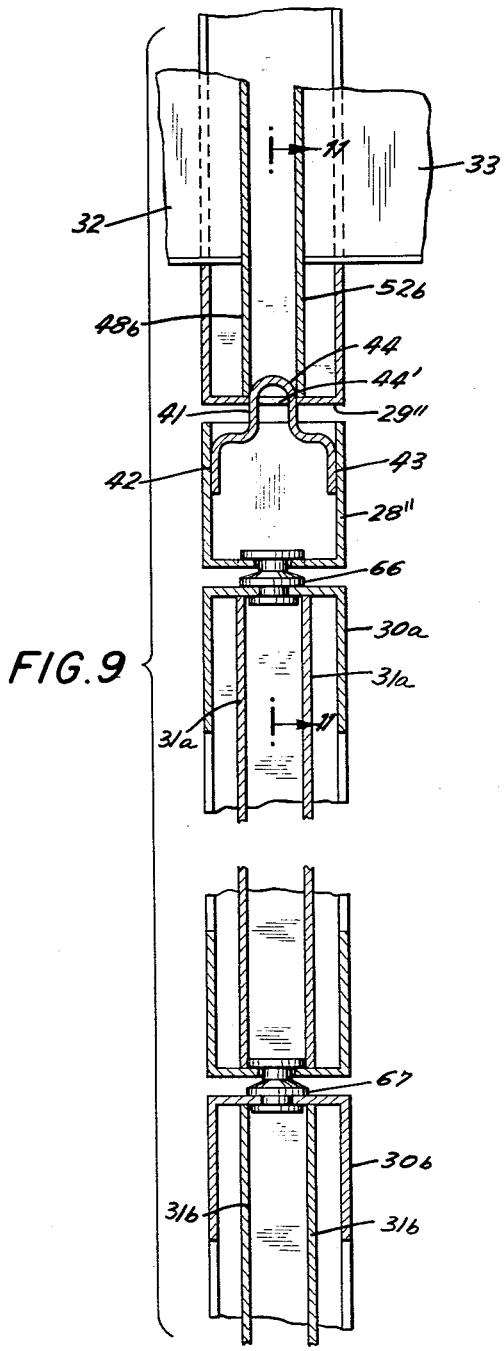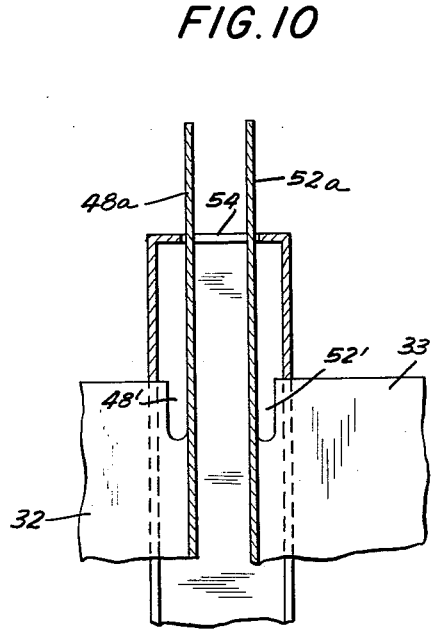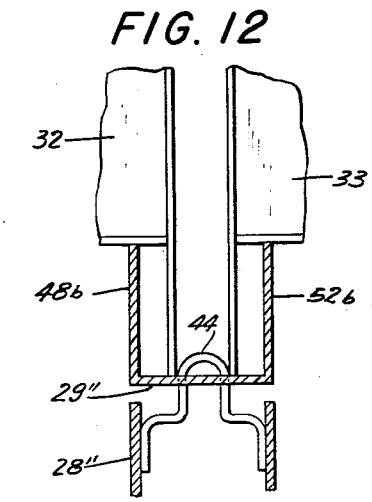

INVENTORS
MILTON IMMERMANN
DANFORTH CARDOZO, JR.
GEORGE WOODS
ROBERT H. ENSIGN
BY Kane, Dalsimer and Kane
ATTORNEYS Jan. 9, 1962 R. H. ENSIGN ET AL 3,015,899
THREE DIMENSIONAL DISPLAY DEVICE
Filed Jan. 29, 1960 9 Sheets-Sheet 7

INVENTORS
MILTON IMMERMANN
DANFORTH CARDOZO, JR.
GEORGE WOODS
ROBERT H. ENSIGN
BY Kane, Dalsimer and Kane
ATTORNEYS

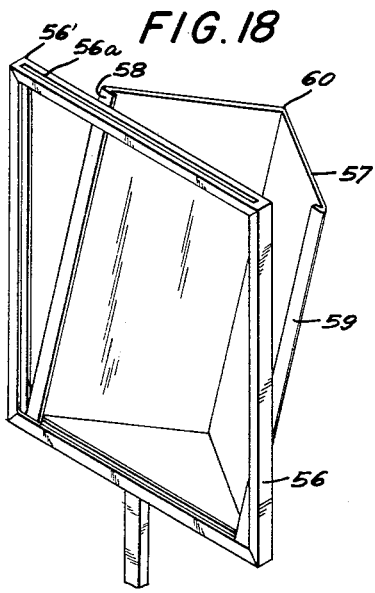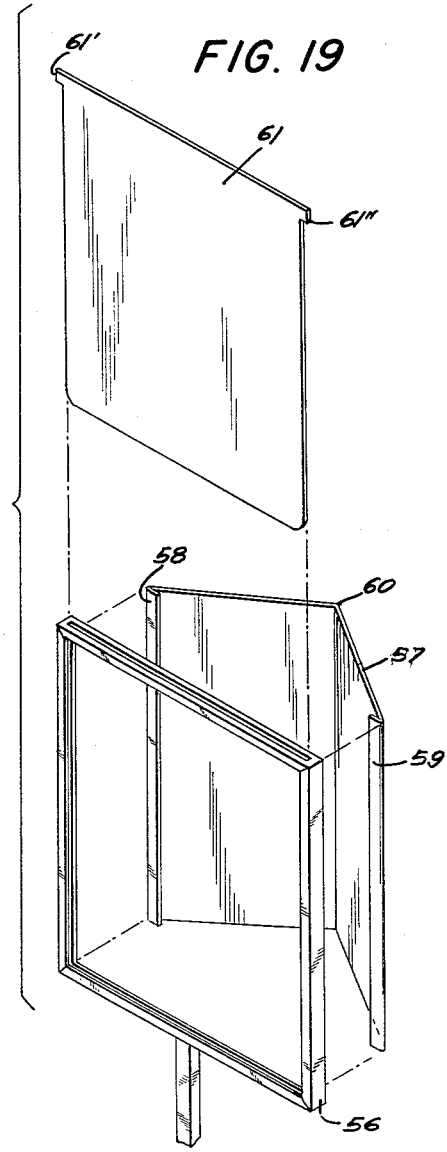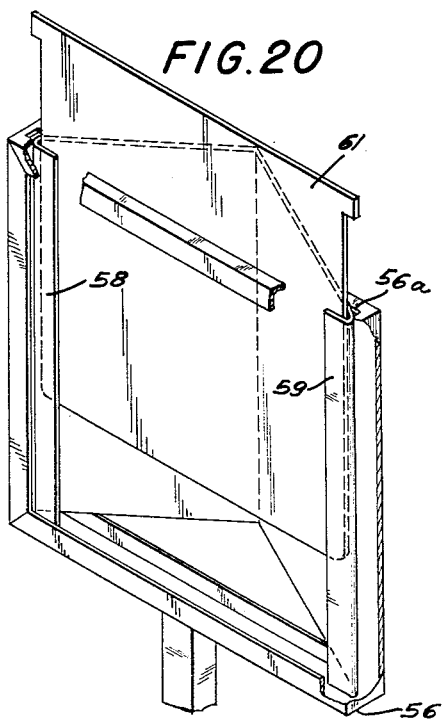

Jan. 9, 1962  R. H. ENSIGN ET AL  3,015,899
THREE DIMENSIONAL DISPLAY DEVICE
Filed Jan. 29, 1960  9 Sheets-Sheet 9

INVENTORS
MILTON IMMERMANN
DANFORTH CARDOZO, JR.
GEORGE WOODS
ROBERT H. ENSIGN
BY Kane, Dalsimer and Kane
ATTORNEYS United States Patent Office 3,015,899
Patented Jan. 9, 1962

3,015,899
THREE DIMENSIONAL DISPLAY DEVICE
Robert H. Ensign, Bronxville, N.Y., Danforth Cardozo, Jr., Weston, Conn., and George Woods, New York, and Milton Immermann, Piermont, N.Y., assignors to The Hopp Press, Inc., New York, N.Y., a corporation of New York
Filed Jan. 29, 1960, Ser. No. 5,487
6 Claims. (Cl. 40—125)

This invention relates generally to display devices and more particularly to a display device which is three dimensional and can be viewed from any one of four directions.

In stores and other public areas where goods and materials are displayed and where an attempt is made to use the full floor space, such as in self-service markets, it is necessary to designate individual counters and areas by identifying indicia. Generally location identifying numerals are used and other identifying indicia are used to designate the particular items on display at a given counter.

In order to both designate the counter or location and also designate the items on display at the counter, at least two types of information must be placed upon any informational marker or display device which is to designate the counter or location. Also the informational marker or display device designating the counter and goods must be of a type which is easily changed or modified when the goods on display are changed or it becomes necessary to vary the counter number. The device must also be capable of easy assembly by unskilled personnel without special tools. Despite this requirement, the unit, when assembled, must remain in proper condition, despite the rough treatment that display devices of this type receive. It is also very important that the sign or display device be clearly visible from all directions so that in crowded stores a person can easily locate the counter or items in which he is interested. Additionally, the display device must occupy very little space when disassembled for storing or shipping.

The invention herein disclosed has as its principal object the furnishing of a display device which will meet these requirements.

Another object of this invention is to provide a display device which is versatile and which can be altered to include additional or less information bearing members according to the desires of the user.

Another object of this invention is the provision of a three dimensional display device in which the information bearing members can be easily replaced, removed or added without the necessity of special tools or skills.

A three dimensional display device embodying the invention and the manner of using the same is described herein with references to the drawings in which:

FIG. 5 is a segmental perspective exploded view of the location indicator portion generally shown in FIG. 1;

FIG. 6 is a segmental exploded detailed view of a portion of the location indicator shown in FIG. 5 illustrating the mounting of the location indicator as mounted in its frame;

FIG. 7 is a segmental perspective exploded view of the three dimensional display device shown in FIG. 1 illustrating the manner in which the item indicating signs are mounted to the main frame;

FIG. 8 is a fragmentary bottom plan view of the web or hanger portion of the main frame;

FIG. 9 is a partially sectional view taken along the line 9—9 in the direction of the arrows as indicated in FIG. 3 showing in detail the manner in which the location indicator and item-designating signs are fastened to the main frame and to one another;

FIG. 10 is a partially sectional view taken along the line 10—10 in the direction of the arrows as indicated in FIG. 3, showing in detail the mounting of the location indicator in its frame;

FIG. 12 is a partially sectional view taken along the line 12—12 in the direction of the arrows as indicated in FIG. 11, showing another detail of the mounting of the location indicator to its frame;

FIG. 18 is a segmental perspective exploded view of an alternate form of location indicator and frame therefor;

FIG. 19 is another segmental perspective exploded view of the location indicator and frame shown in FIG. 18 with the retaining sheet which is used in this embodiment shown;

FIG. 20 is another segmental perspective exploded view of the location indicator and frame illustrated in FIG. 18, showing the manner in which the retaining sheet is utilized to mount the location indicator in its frame.

Figure 1:
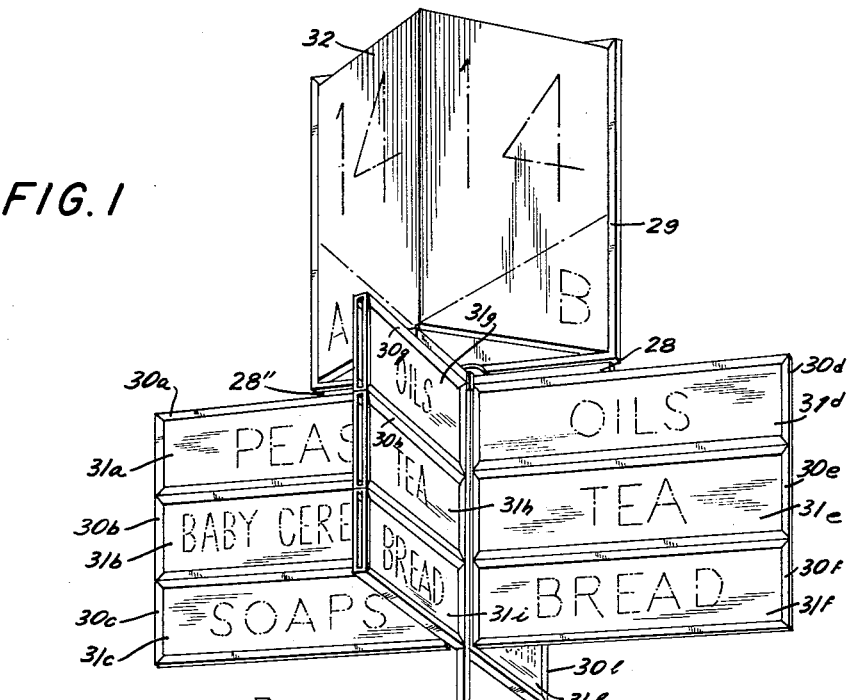
FIG. 1 is a front perspective view of a three dimensional display device constructed in accordance with the teachings of this invention.
Figure 2:
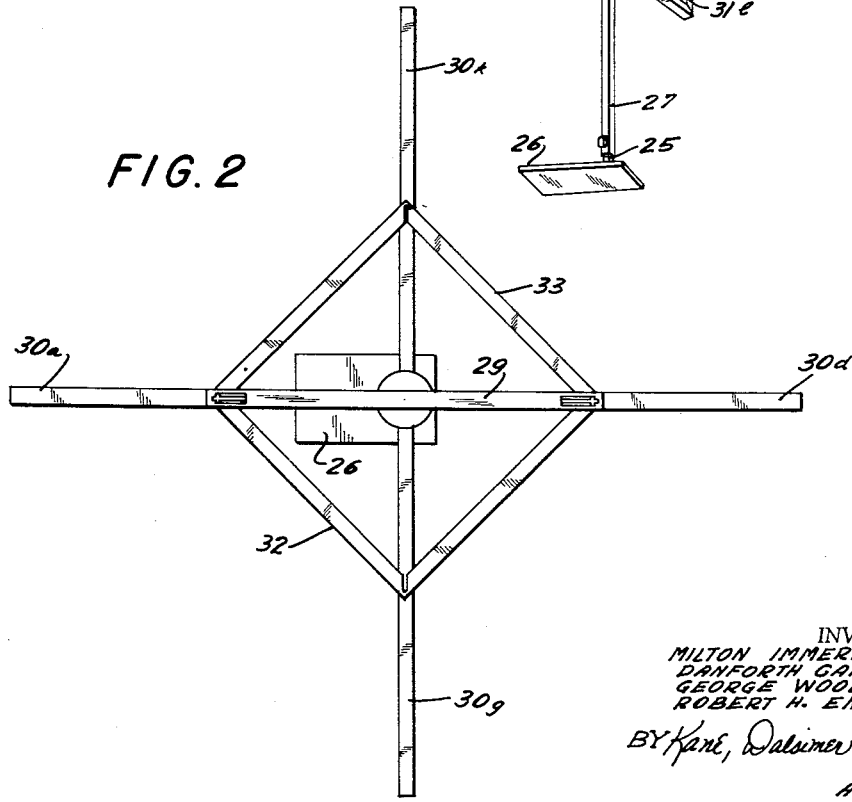
FIG. 2 is a top plan view of the display device shown in FIG. 1.
Figure 3:
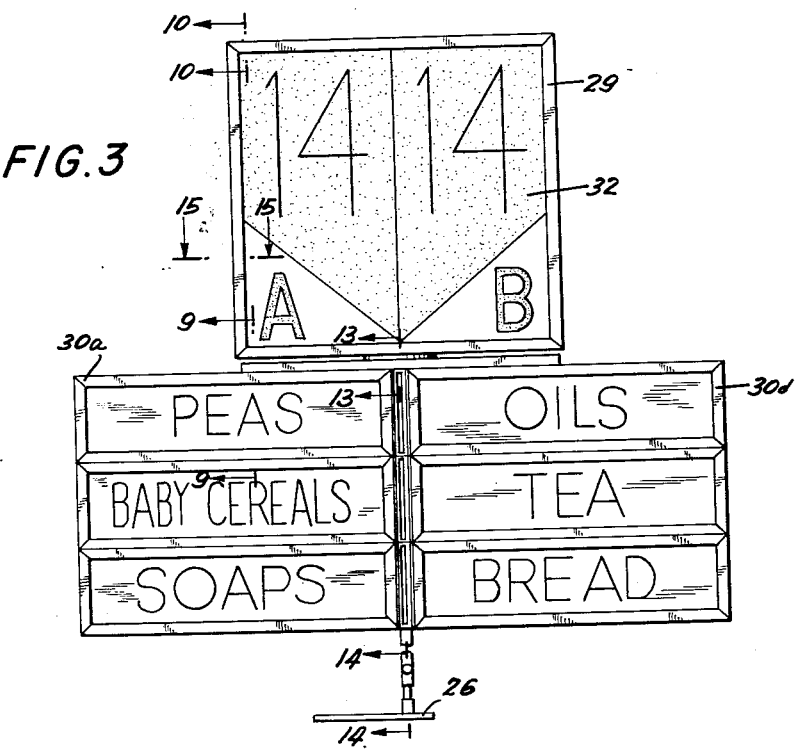
FIG. 3 is an elevational view of the assembly.
Figure 4:
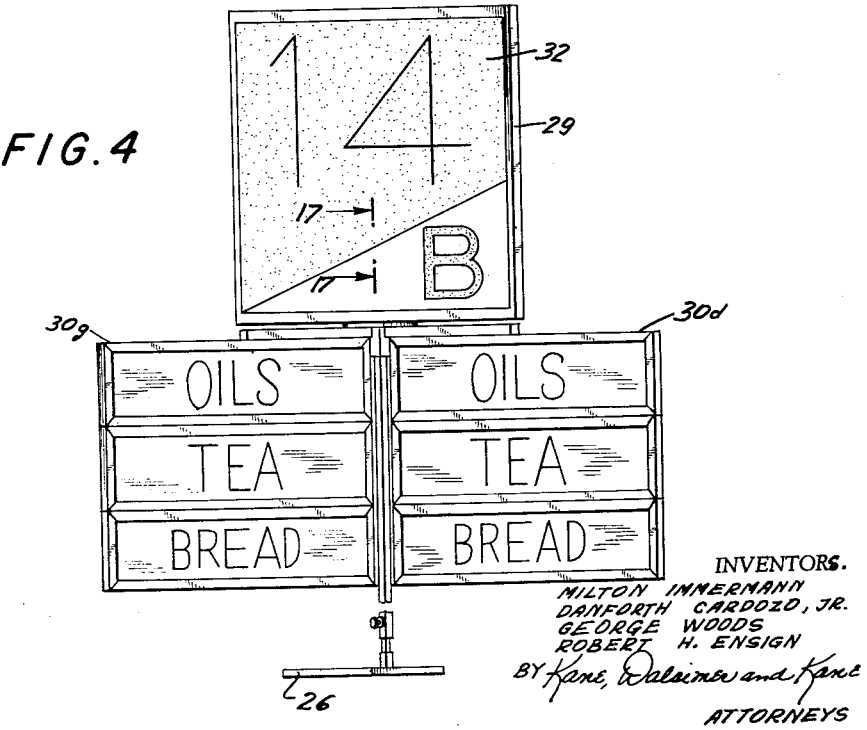
FIG. 4 is another elevational view of the device shown in FIG. 1 slightly rotated so that it is viewed in a different position than is shown in FIG. 3.

The three dimensional display device which is the subject of this invention is shown in its entirety in FIGS. 1 through 4 wherein upright 25, which is formed of a strong rigid material such as metal is attached at its lower end to base 26 and hollow upright 27 is telescoped over member 25. Hanger 28 is mounted on top of this support in turn mounts location indicator frame 29 and item indicating frames, which are each designated in the drawings by the numeral 30. It is noted that there are twelve item indicating frames and each mounts an item indicating sign which is indicated in the drawings by the numeral 31. For ease of identification each of the item indicating frames and signs is given a different small letter following its main numeral 30. Hence, on the left in FIG. 1 frames 30a, 30b and 30c are seen containing signs 31a, 31b and 31c, respectively, whereas on the right frames 30d, 30e and 30f are shown containing signs 31d, 31e and 31f, respectively. Projecting outwardly toward the viewer in FIG. 1 frames 30g, 30h and 30i display mounted signs 31g, 31h and 31i, respectively, whereas behind the sign and blocked from view in FIG. 1 are frames 30j and 30k bearing signs 31j and 31k. An edge of frame 30l containing sign 31l is visible. The location indicator frame 29 has mounted therein location indicators 32 and 33, respectively.

Figure 13:
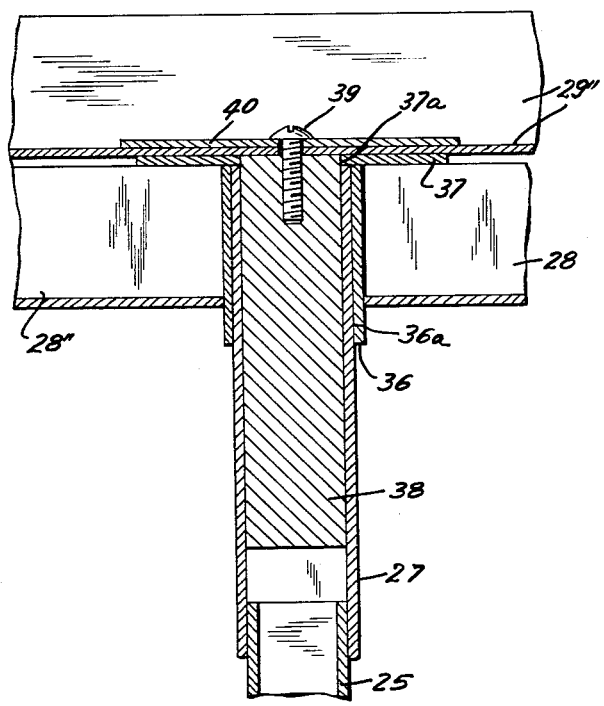
FIG. 13 is a partially sectional view taken along the line 13—13 in the direction of the arrows as indicated in FIG. 3, showing in detail the mounting of the web or hanger to the main frame.
Figure 17:
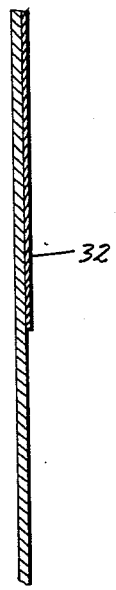
FIG. 17 is a partially sectional view taken along the line 17—17 in the direction of the arrows as indicated in FIG. 4.
Figure 14:
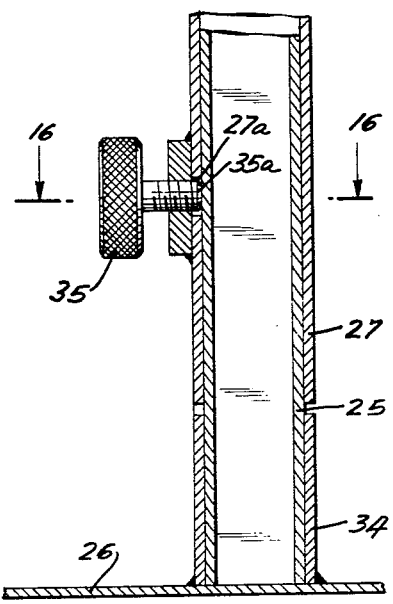
FIG. 14 is a partially sectional view taken along the line 14—14 in the direction of the arrows as indicated in FIG. 3, showing in detail the manner in which the main frame base is connected to the remainder of the main frame.
Figure 16:
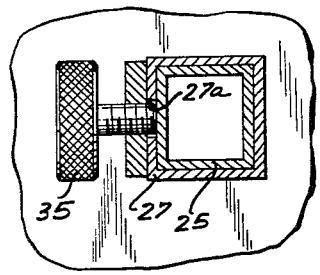
FIG. 16 is a partially sectional view taken along the line 16—16 in the direction of the arrows as indicated in FIG. 14, showing in detail another view of the main frame.

Referring now to FIGS. 13, 14 and 16, it is seen that base 26 of the main frame is rectangular and flat and has welded thereto hollow upright mounting portion 34 which has inserted therein the lower end of lower upright 25 over which upper upright 27 telescopes. The upper upright 27 is formed with opening 27a therein so that set screw or adjusting screw 35 can pass therethrough to enable a user to adjust the relative telescoping position of member 27 over 25. Tightening screw 35 so that its end 35a bears against member 25 maintains the uprights 25 and 27 in position and free from relative movement.

The web or hanger, which is seen in perspective in FIG. 7, contains four horizontally extending arms 28, 28', 28'' and 28'''. The outwardly extending arms are integrally joined—each at an end—to rectangular center member 36 which has mounted on top thereof disc 37. Body 36, as in FIG. 13, defines a rectangular recess 36a which enables body 36 to telescope upright 27 at the upper end thereof. Disc 37 has a square central aperture 37a which is smaller than recess 36a (FIG. 7) and smaller in width than upright 27 so that when member 36 is telescoped over the end of upper upright 27, disc 37 prevents the web assembly from sliding downwardly. In order to prevent rattling or noise when the assembly is completed, member 36 is formed to receive the upper end of upright 27 in a tight fit.

The location indicator frame 29 is mounted atop web 28 as shown in FIG. 13 by insertion of mounting member 38 through square opening 37a. Upon insertion of member 38 through opening 37a the frame is also inserted through opening 36a and into the hollow portion of upper upright 27 so that it is maintained in position on top of web 28. Frame 29 is attached to mounting member 38 by means of screw 39 and mounting plate 40 so that by insertion of mounting member 38 through opening 37a, the location indicator frame 29 is mounted on top of the upright 27.

All of the components thus far described are formed from a substantially rigid material which will maintain its shape. While it is preferred to use metal, however, any other suitable material which will maintain its shape can be utilized.

The location indicator is formed from three principal members, frame 29 and location indicator cards 32 and 33. The frame is a substantially square metal member and can be seen in perspective in FIG. 5. The frame mounting has a base 29'' (FIG. 6), two side members and a top member 29' and each of these members is U-shaped in cross section. Screw 39 and plate 40 are used to fasten mounting member 38 to the base side of the bottom member 29'' of the frame in order to mount frame 29 by upright 27.

Figure 11:
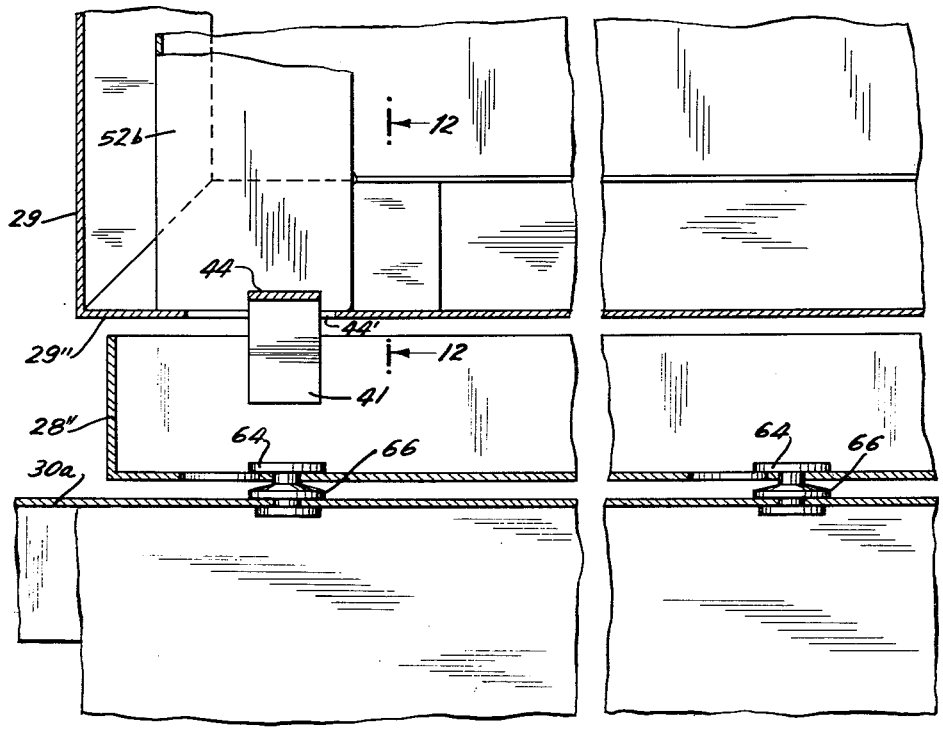
FIG. 11 is a partially sectional view taken along the line 11—11 in the direction of the arrows as indicated in FIG. 9, showing in detail the manner in which the location indicator and item indicating signs are fastened to the main frame and to one another.
Figure 15:
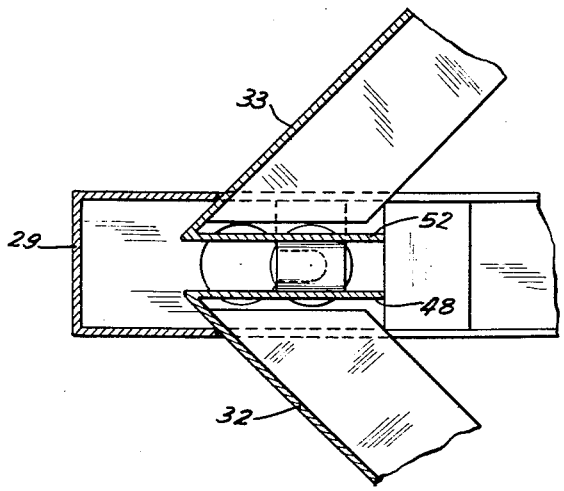
FIG. 15 is a partially sectional view taken along the line 15—15 in the direction of the arrows as indicated in FIG. 3, showing in detail the manner in which the location indicator is mounted in its frame.

The frame mounting 29 shown and described herein is a rigid member and is formed from a metal. However, any suitably rigid material may be used for this purpose. The frame mounting is supported in vertical upright 27 as shown in FIG. 13 and the relationship of the web and frame mounting in this position is shown in FIGS. 9 and 11 wherein the numerals 29 and 29'' designate the frame mounting and the numeral 28'' designates the web.

The web is also U-shaped in cross section. Each arm of the web has its base disposed downwardly so that its top portion is opened upwardly toward the frame base 29''. The disposition of the frame mounting and the arms of the web 28 can be seen clearly in FIG. 1, wherein the base of the frame mounting lies directly above two arms of web 28 with the remaining two arms extending perpendicularly outward therefrom. Thus, the base of the frame mounting for the location indicator lies directly above arms 28 and 28'' of the web mounting with arms 28' and 28''' extending perpendicularly outward therefrom.

Positioning members 41 are fastened by welding or otherwise to the sides of the channel forming the web arms. As seen in FIG. 9, a positioning member is fastened at 42 and 43 to the inside surfaces of the arms of the U of web 28 and has a portion 44 extending upwardly and into slot 44' formed in the base of the mounting frame 29. These positioning members are also seen in perspective in FIG. 7 and an identical positioning member attached in like manner is shown disposed within the other web arm which underlies the mounting frame. One positioning member lies in web arm 28 and another positioning member lies in web arm 28''. In each instance the positioning member is indicated by the numeral 41. This positioning member serves to stabilize or make the final assembly more rigid. It has been found, however, that it is not absolutely necessary to utilize the positioning member, and structures may be constructed in accordance with the teachings of this invention which omit these members.

Location indicator signs 32 and 33 are identical and each is formed from a stiff material which is foldable such as plastic, cardboard or otherwise. The material which we have utilized is a translucent plastic so that light from above or below can pass therethrough. The member 32 shown in the lower portion of FIG. 5 is formed from a substantially rectangular piece of this material and is folded in half upon itself along fold line 45. It is also folded over at each of its edges so that it has a top fold over 46, a bottom fold over 47 and side fold overs 48 and 49. The side fold overs 48 and 49 are necessary for mounting the member in the mounting frame 29. The top and bottom fold overs 46 and 47, respectively, give the indicator member additional strength. It is noted that the top and bottom fold overs are slotted at 46' and 47', respectively, which lie at either end of line 45 to allow folding along that line 45. Additional slots 48' and 48'' appear in the top and bottom juncture of the side fold over 48 with the top fold over 46 and bottom fold over 47 so that the side fold over 48 can be formed with upwardly directed tab 48a and downwardly directed tab 48b which are utilized in order to mount the member within the frame mounting as will be explained below. Likewise, top fold over 46 and bottom fold over 47 are formed with slots 49' and 49'' to provide for additional tabs 49a and 49b on side fold over 49 to allow for mounting that side in the frame mounting.

Location indicator card 33 as stated before is identical with location indicator card 32 and is formed with top fold over 50 which is slotted at 50' in the center thereof and bottom fold over 51 which is slotted at the center thereof at 51'. Side fold overs 52 and 53 are provided on member 33 and formed with slots 52' and 52'' enabling the formation of tabs 52a and 52b on one side thereof and slots 53' and 53'' forming tabs 53a and 53b on the side thereof.

Mounting frame 29 is provided with two slots in the base of its top 29'. These slots are indicated by the numerals 54 and 55 and are formed to receive upper tabs 48a and 49a of indicator card 32 and upper tabs 52a and 53a of indicator card 33. The manner in which an indicator card is placed in the frame and maintained there is seen clearly in FIG. 6, wherein a segmental view of card 32 is shown with tab 49a partially disposed through slot 55 in top 29' of frame 29. As seen in this drawing, the tab 49a is about half-way through slot 55 and the indicator card is being rotated counterclockwise in the direction of the arrow indicated by the letter "A." Slot 49' is about to receive a side of the U of top 29' and tab 49b is about to be inserted between the sides of the U-cross section of base 29". The slot 49' enables the one making the insertion to raise the indicator card 32 sufficiently to enable tab 49b to fall within the sides of the U of bottom 29". When this has been accomplished, and the indicator card released, tab 49b will lie between the sides of the U forming the base 29" and tab 49a will lie with a portion thereof within slot 55 and the remainder of the tab between the U sides of top 29'. Slot 49' has in this instance been utilized only for the mounting of the member and once the indicator card has been mounted within the frame, the U side of top 29' no longer lies within slot 49'.

After this side has been inserted within the mounting frame, the side 48 having the tabs 48a and 48b is mounted in an identical manner by utilization of slot 54 in top 29' of frame 29 and then the card 33 is mounted in exactly the same manner.

After each of the cards has been mounted the slots 54 and 55 have extending therethrough tabs 52a and 48a and tabs 53a and 49a, respectively, with side fold overs 48 and 52 adjacent each other and side fold overs 49 and 53 adjacent each other. The location indicator then gives the appearance of a four-sided member with a corner of the frame overlying arm 28" of the web and a corner of the frame overlying arm 28 of the web.

The remaining corners of the location indicator appear to overlie arms 28' and 28" of the web 28.

An alternate form of location indicator is shown in FIGS. 18, 19 and 20. In these drawings the location indicator frame mounting is indicated by the numeral 56 and has the same configuration as the mounting frame in the preferred embodiment. Generally, however, the top edge 56' is formed with a slot 56a extending substantially the length of the base side of the top edge 56'. Referring to FIG. 5, it is seen that with slots 54 and 55 provided in top base 29' it would be impossible for the insertion of a two dimensional sign therein, whereas in the alternate form of the embodiment shown in FIGS. 18 through 20, a flat sign can be inserted within the slot 56a to be held by the frame 56 when it is desired to make the location indicator two dimensional. In order to utilize the frame shown in FIGS. 18 through 20 for three dimensional viewing, a location sign 57 with side fold overs 58 and 59 is provided. The sign is folded in half upon itself along fold line 60 and can be formed from the same material as sign 32 or 33. In this embodiment however, a retaining sheet 61 is used in order to retain the location indicating sign in position. The retaining sheet 61 is substantially rectangular and formed to be inserted through slot 56a after sign 57 has been placed with fold overs 58 and 59 beneath the slot 56a. As shown in FIG. 20, after positioning the sign 57, retaining sheet 61 is inserted through slot 56a and between the sign 57 and fold overs 58 and 59, respectively. The retaining sheet 61 serves to maintain sign 57 in position and the sign 57 cannot be removed from frame 56 without first removing the retaining sheet.

It is noted that the retaining sheet has transverse tabs 61' and 61" at the top thereof which, by bearing against frame 56, aid in maintaining the retaining sheet and sign 57 in position.

Although a second location indicating sign is not shown in FIGS. 18 through 20, such a unit identical with sign 57 can be used with a second retaining sheet, in order to make the location indicator three dimensional. Thus, this alternate embodiment can be used for two or three dimensional viewing.

The item indicating signs which I have designated in the drawings by the numerals 31 can be of the type shown and described in United States Patent No. 2,785,487 issued in the name of P. Hopp, March 19, 1957, and are attached to the web by means of keyhole slots 62, 63, 64 and 65 (FIG. 8) and pins in the base of the U channels of the web. Frames 30a and 30b are illustrated equipped with pins 66 in the top of frame 30a and pins 67 in the top of frame 30b. Each of these frames contains a corresponding set of pinhole slots 68 and 69 in its base member. The pins 66 are positioned so as to be placeable within slots 64 in web arm 28" by means of insertion and sliding to the right. Likewise, pins 67 are formed to be received by slots 68 formed in the bottom of item indicating frame 30a so that a group of item indicating frames can be suspended from each of the web arms.

It is seen therefore that a very flexible arrangement has been provided, a structure in which the location indicator is a three dimensional indicating member and the item indicators are arranged so that they too are three dimensional and can be viewed from any position. Observance of FIG. 1 shows the display device with its three dimensional arrangement, however, it should be understood that the versatility of the display device allows for removal of any of the item indicating signs so that a two dimensional effect can be achieved. Thus, if the frames 30a, 30b, 30c, 30d, 30e and 30f were removed a two dimensional item indicating device would be seen and additionally, if instead of removing these item indicating signs, the item indicating signs 30g, 30h, 30i, 30j, 30k and 30l were removed and the alternate form of location indicator shown in FIGS. 18 through 20 were used, the complete sign would be a two dimensional one.

In addition to providing a versatile three dimensional sign which is new and very useful we have provided such a sign which can be easily stored, or which can be easily shipped, and which can be assembled or disassembled with ease. Thus, in FIG. 21 all of the components of a display device constructed in accordance with the invention are shown, and in order to indicate the various components, they are given the same numerals which were used in FIG. 1. Thus, starting from the top in FIG. 21, location indicating signs 33 and 32 are shown laid out flat, so that one can be placed over the other. Location indicating frame 29 and web 28 with the base 26 and upright members 25 and 27 are shown beneath the location indicator signs, and from the exploded view shown in FIG. 21, it is clear that these components can be laid one upon the other for flat storage or flat packing for shipping. Additionally, the item indicating signs and frames form a very neat package as seen also in FIG. 21 wherein the signs 31a through 31l are shown stacked one upon the other as are also the frames 30a through 30l.

Figure 21:
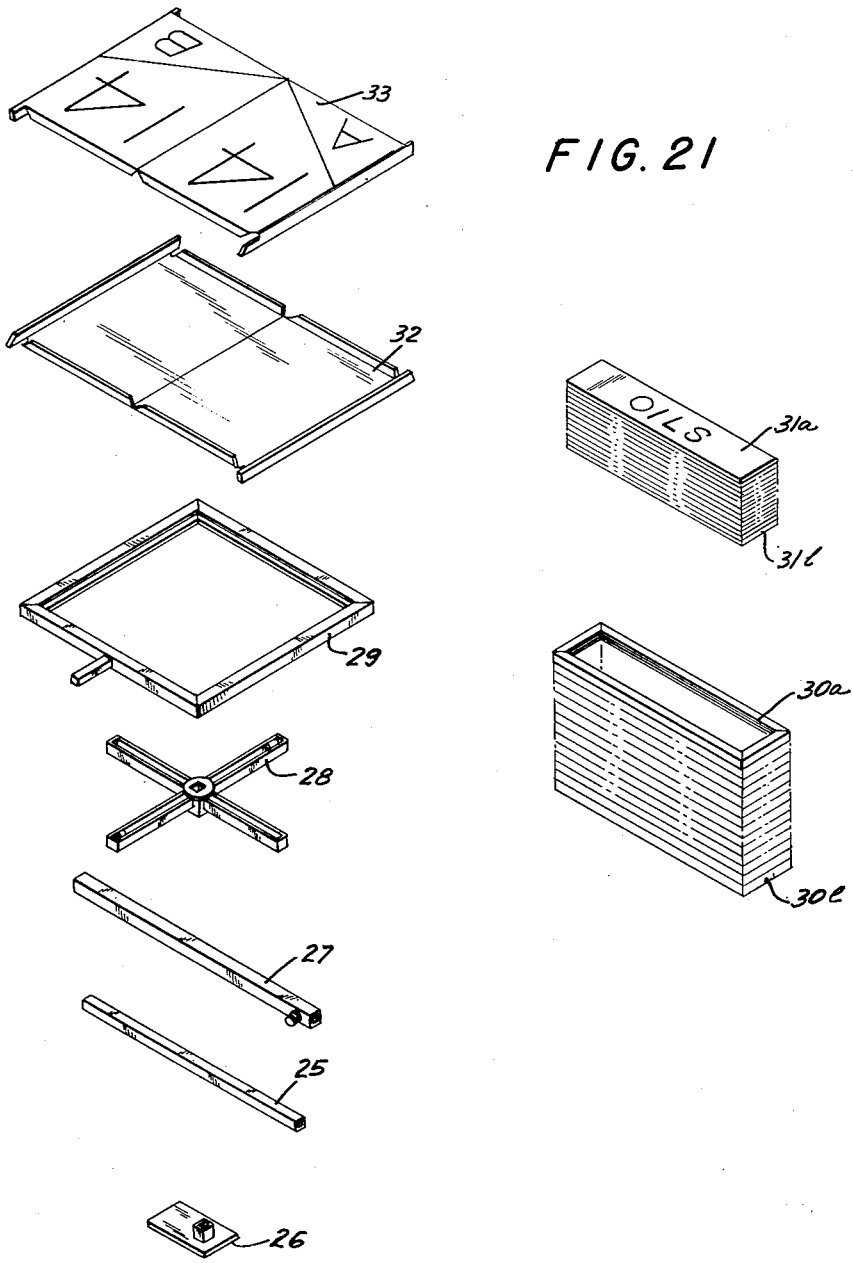
FIG. 21 is an exploded perspective view of the three dimensional display device shown in FIG. 1, disassembled with the components thereof arranged for shipping or storage.

In order to assemble the device, the proposed user takes a package such as shown in FIG. 21 and fastens the upright members 25 and 27 to the base 26, inserts the web 28 within the opening in the top end of vertical member 27 and then applies location indicating frame 29 thereto by insertion of mounting member 38 through the opening in the center of the web.

The item indicating signs to be used are then placed within the item indicating frames and by means of the keyhole slots and pins a sufficient quantity of item indicators are placed in the appropriate positions so that all of the items on the shelves are fully identified.

The location indicators are then assembled by means of insertion of location signs 32 and 33 so that the unit appears as it does in FIG. 1.

It should be understood that if it is desired—of course—it can be made two dimensional and also if it is desired, more or less than the number of item indicating signs shown in FIG. 1 can be applied since it is not necessary that the item indicating signs be hung in tandems of three. The base is such that the display device will be supported upright even if the number of item indicating signs applied thereto is altered to result in an unbalanced condition.

Thus, among others, the several objects in the invention as specifically aforenoted, are achieved. Obviously, numerous changes in construction and rearrangement of parts might be resorted to without departing from the spirit of the invention as defined by the claims.

We claim:
1. In a display device a base member, an upright extending vertically upward from said base member, a four sided rectangular frame member mounted on said upright, each of the sides of said frame member having a U-channel cross section with the base thereof forming the periphery of said frame, a rectangular indicating member of greater width than said frame, an edge of said indicating member maintained within a vertical side of said frame, an opposite edge of said indicating member maintained within the opposite vertical side of said frame, and a vertical bend in said indicating member allowing the bend portion to project outwardly away from said frame.

2. A display device in accordance with claim 1, in which a second rectangular indicating member is provided having vertical edges thereof maintained within the vertical sides of the frame and a bend allowing the second indicating member to project outwardly away from said frame and said first indicating member.

3. A display device in accordance with claim 2, in which each of the indicating members is provided with folded vertical edge portions and tabs thereon extending beyond the indicating member and the bases of the horizontal sides of the frame and slotted to receive said tabs.

4. A display device in accordance with claim 1, in which the indicating member is provided with vertical edge portions and a rectangular holding member having an edge thereof between the indicating member and one of said folded vertical edge portions and having a second edge thereof between the indicating member and the remaining folded vertical edge portion whereby the indicating member is maintained in position.

5. A display device in accordance with claim 4, in which the base of the upper horizontal side of the frame is formed with a slotted opening through which the rectangular holding member can be passed.

6. A display device in accordance with claim 2, in which the indicating members are formed of a translucent material for the passage of light therethrough.

References Cited in the file of this patent
UNITED STATES PATENTS

| | | |
|---|---|---|
| 1,478,511 | Fetters | Dec. 25, 1923 |
| 1,480,606 | Fetters | Jan. 15, 1924 |
| 2,407,592 | Wathen | Sept. 10, 1946 |
| 2,772,494 | Bishop | Dec. 4, 1956 |
| 2,785,487 | Hopp | Mar. 19, 1957 |
| 2,802,291 | Bock et. al. | Aug. 13, 1957 |
| 2,913,840 | Joseloff | Nov. 24, 1959 |